(12) United States Patent
Suzuki (10) Patent No.: US 7,524,088 B2
(45) Date of Patent: Apr. 28, 2009

(54) LIGHT SOURCE UNIT AND PROJECTOR SYSTEM

(75) Inventor: Yukio Suzuki, Hamura (JP)

(73) Assignee: Casio Computer Co., Ltd., Tokyo (JP)

(*) Notice: Subject to any disclaimer, the term of this patent is extended or adjusted under 35 U.S.C. 154(b) by 248 days.

(21) Appl. No.: 11/590,260

(22) Filed: Oct. 31, 2006

(65) Prior Publication Data
US 2007/0115664 A1 May 24, 2007

(30) Foreign Application Priority Data
Nov. 18, 2005 (JP) ............................. 2005-334141

(51) Int. Cl.
*F21V 33/00* (2006.01)
(52) U.S. Cl. ....................... 362/268; 362/293
(58) Field of Classification Search ................. 362/268, 362/293
See application file for complete search history.

(56) References Cited

U.S. PATENT DOCUMENTS 5,335,044 A * 8/1994 Shiraishi ...................... 355/53

6,603,606 B2 * 8/2003 Kitabayashi ................. 359/634

FOREIGN PATENT DOCUMENTS

JP 6-51401 A 2/1994
JP 2002-298625 A 10/2002

* cited by examiner

*Primary Examiner*—Laura Tso
(74) *Attorney, Agent, or Firm*—Frishauf, Holtz, Goodman & Chick, P.C.

(57) ABSTRACT

A light source unit includes a light source made up of a reflector having a lamp accommodating opening and a light exiting opening, and a lamp having a bulb for emitting light and electrode introducing portions which guide electrodes into the bulb. In addition, the light source unit includes an anomalous lens which is disposed to collect light emitted from the light source to be situated on an optical axis of the light emitted from the light source, and a condenser lens for collecting light which has exited from the anomalous lens. The lamp is inserted into the reflector from the lamp accommodating opening, and the bulb is disposed within the reflector so that a position of a focal point of radiated light which is reflected from an inner wall of the reflector is not situated on the electrode introducing portions and the anomalous lens, but is situated between the electrode introducing portions and the anomalous lens, forming a circle centered at an optical axis of the radiated light.

4 Claims, 11 Drawing Sheets

LIGHT SOURCE UNIT AND PROJECTOR SYSTEM

BACKGROUND OF THE INVENTION

The present invention relates to a light source unit and a projector system including the light source unit, and more particularly to a light source unit which is made small in size without reducing the utilizing efficiency of light from a light source and a projector system including the light source unit.

A projector system is designed such that light emitted from a light source unit is passed through a color wheel and is then caused to enter a mirror tunnel to produce light of a uniform intensity distribution, and the light is projected while changing the quantity thereof for each pixel by a micromirror device or a liquid crystal display device, so as to display an image on a screen.

Figure 13:
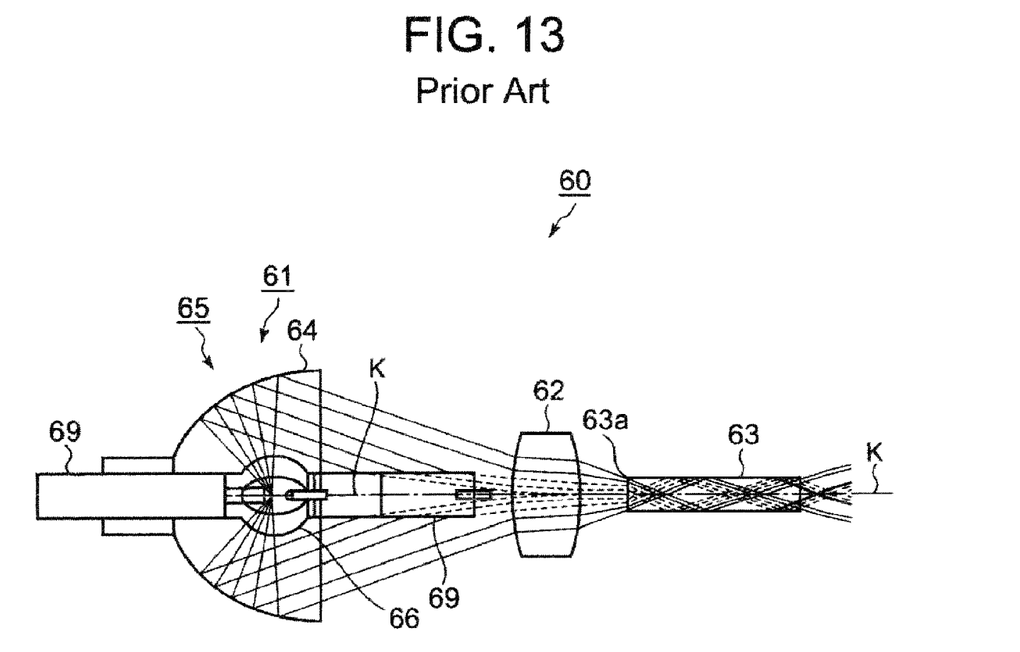
FIG. 13 is a sectional view of a conventional light source unit.

As a conventional light source unit, for example, there exists a light source unit 60 which includes, as shown in FIG. 13, a light source 61 which emits light, a convex lens 62 disposed on an optical axis K to collect the light emitted from the light source 61 and a mirror tunnel 63 which the light which has exited from the light source 61 is caused to enter (refer to Patent Document No. 1).

The light source 61 is made up of a reflector 64 and a lamp 65 which is inserted into the reflector 64. The lamp 65 is made up of a bulb 66 and electrode introducing portions 69, 69, and the bulb 66 is designed to be inserted into the reflector 64. Note that the color wheel is omitted from the illustration in FIG. 13.

Here, since part of light emitted from the bulb 66 and reflected by an inner wall of the reflector 64 resides within the electrode introducing portions 69, the quantity of effective light is dampened. In addition, the convex lens 62 cannot shine sufficiently the light reflected by the reflector 64 on to an entrance surface 63a of the mirror tunnel 63.

Due to this, the light source unit 61 needs to have a certain size or larger in order to secure a certain quantity of light, and a projector system which incorporates therein the light source unit tends to be made large in size, the carriage and setting of the projector system made so large is not necessarily easy.

In addition, although a small light source unit is preferable with a view to making small the whole projector system, a lamp in the light source unit is needs to have the certain size or larger with a view to securing the quantity of light.

Patent Document No. 1: Japanese Unexamined Patent Publication No. 6-51401

SUMMARY OF THE INVENTION

According to a preferred aspect of the invention, there is provided a light source unit including a light source made up of a reflector in which a lamp accommodating opening and a light exiting opening are formed and whose inner surface is mirror finished and a lamp including, in turn, a bulb for emitting light and electrode introducing portions which guide electrodes into the bulb, wherein the bulb is disposed such that the position of a focal point of radiated light which is radiated from the bulb and reflected by an inner wall of the reflector when the lamp is inserted into the reflector from the accommodating opening is situated at neither of the electrode introducing portions, an anomalous lens which is disposed not only to collect light emitted from the light source but also to be situated on an optical axis of the light emitted from the light source, a reflecting mirror for reflecting light which has exited from the anomalous lens, and a lens for collecting light from the reflecting mirror.

Furthermore, according to another preferred aspect of the invention, there is provided a projector system including a light source unit including, in turn, a light source made up of a reflector in which a lamp accommodating opening and a light exiting opening are formed and whose inner surface is mirror finished and a lamp including, in turn, a bulb for emitting light and electrode introducing portions which guide electrodes into the bulb, wherein the bulb is disposed such that the position of a focal point of radiated light which is radiated from the bulb and reflected by an inner wall of the reflector when the lamp is inserted into the reflector from the accommodating opening is situated at neither of the electrode introducing portions, an anomalous lens which is disposed not only to collect light emitted from the light source but also to be situated on an optical axis of the light emitted from the light source, a reflecting mirror for reflecting light which has exited from the anomalous lens, and a lens for collecting light from the reflecting mirror, a color wheel for converting light which has exited from the lens into light of a predetermined color, a mirror tunnel for guiding light which has exited from the lens, a condenser lens for collecting light which has exited from the mirror tunnel, a micromirror device for receiving light which has exited from the condenser lens to project an image, and a projection lens for enlarging the image projected from the micromirror device.

Furthermore, according to a further preferred aspect of the invention, there is provided a light source unit including a light source made up of a reflector in which a lamp accommodating opening and a light exiting opening are formed and whose inner surface is mirror finished and a lamp including, in turn, a bulb for emitting light and electrode introducing portions which guide electrodes into the bulb, wherein the bulb is disposed such that the position of a focal point of radiated light which is radiated from the bulb and reflected by an inner wall of the reflector when the lamp is inserted into the reflector from the accommodating opening is situated at neither of the electrode introducing portions, and an anomalous lens which is disposed not only to collect light emitted from the light source but also to be situated on an optical axis of the light emitted from the light source.

Furthermore, according to a preferred aspect of the invention, there is provided a projector system including a light source unit including, in turn, a light source made up of a reflector in which a lamp accommodating opening and a light exiting opening are formed and whose inner surface is mirror finished and a lamp including, in turn, a bulb for emitting light and electrode introducing portions which guide electrodes into the bulb, wherein the bulb is disposed such that the position of a focal point of radiated light which is radiated from the bulb and reflected by an inner wall of the reflector when the lamp is inserted into the reflector from the accommodating opening is situated at neither of the electrode introducing portions, and an anomalous lens which is disposed not only to collect light emitted from the light source but also to be situated on an optical axis of the light emitted from the light source, a color wheel for converting light which has exited from the lens into light of a predetermined color, a mirror tunnel for guiding light which has exited from the lens, a condenser lens for collecting light which has exited from the mirror tunnel, a micromirror device for receiving light which has exited from the condenser lens to project an image, and a projection lens for enlarging the image projected from the micromirror device.

DESCRIPTION OF PREFERRED EMBODIMENTS

First Embodiment

Next, an embodiment of the invention will be described by reference to the accompanying drawings. However, the scope of the invention is not limited by an example illustrated in the drawings.

Figure 1:
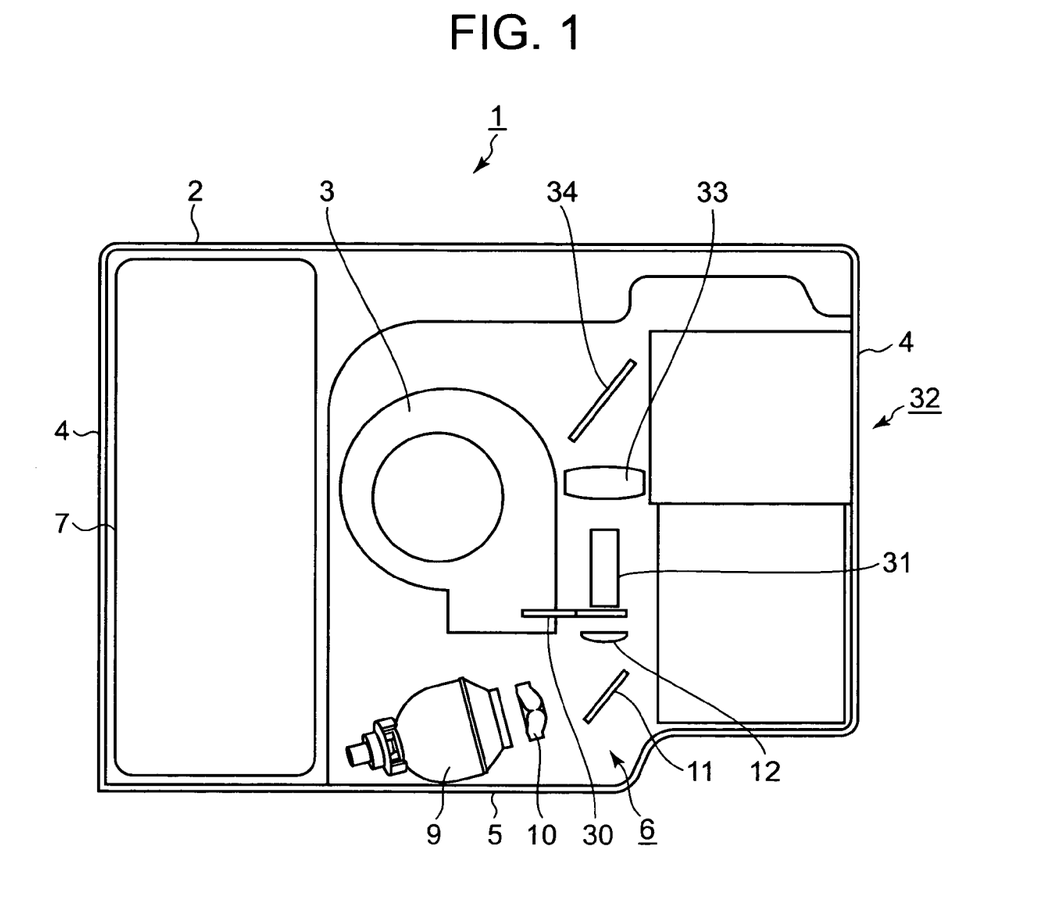
FIG. 1 is a plan view of an interior of a projector system according to a first embodiment of the invention.
Figure 2:
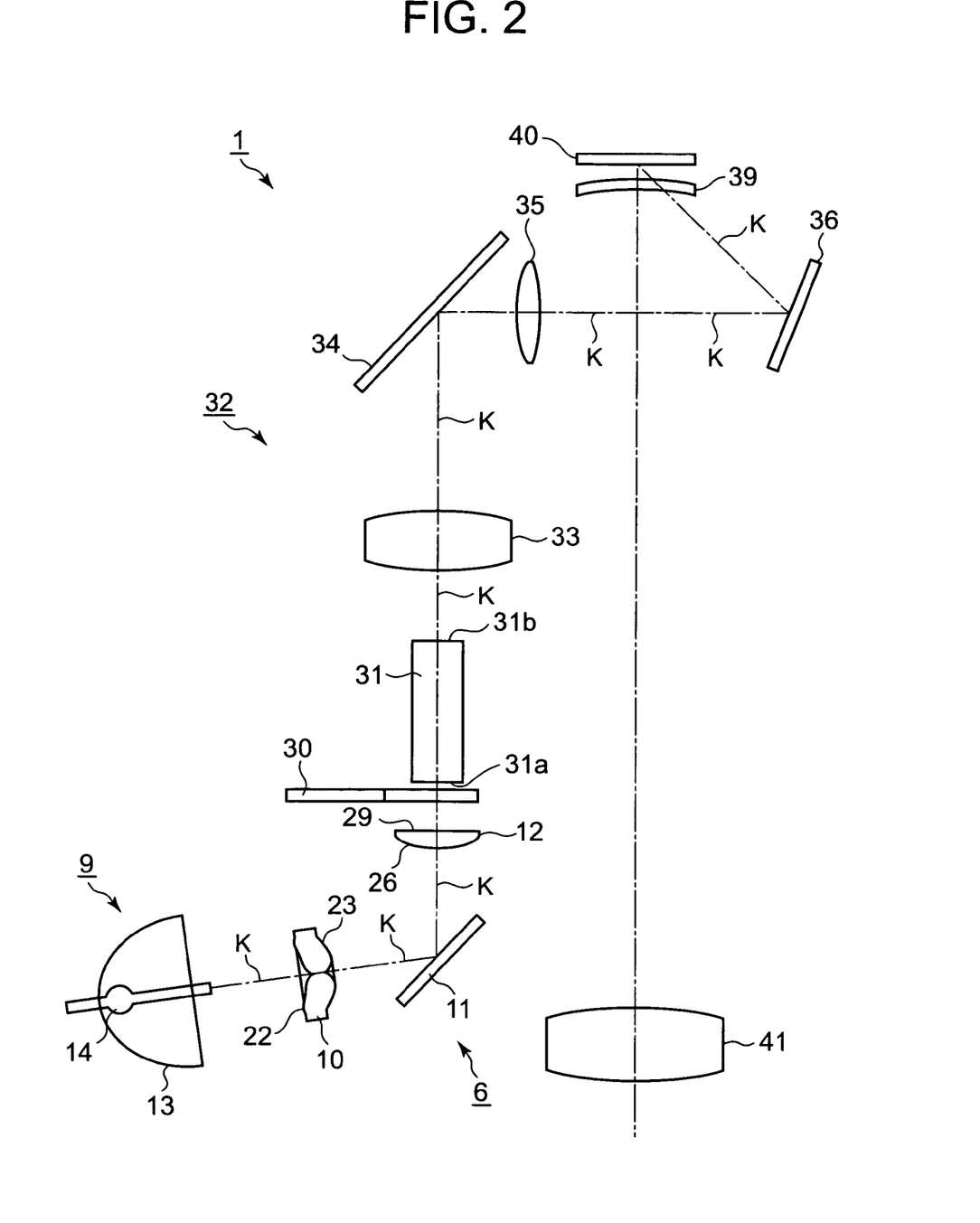
FIG. 2 is a schematic diagram showing the configuration of an optical system of the projector system according to the first embodiment.
Figure 3:
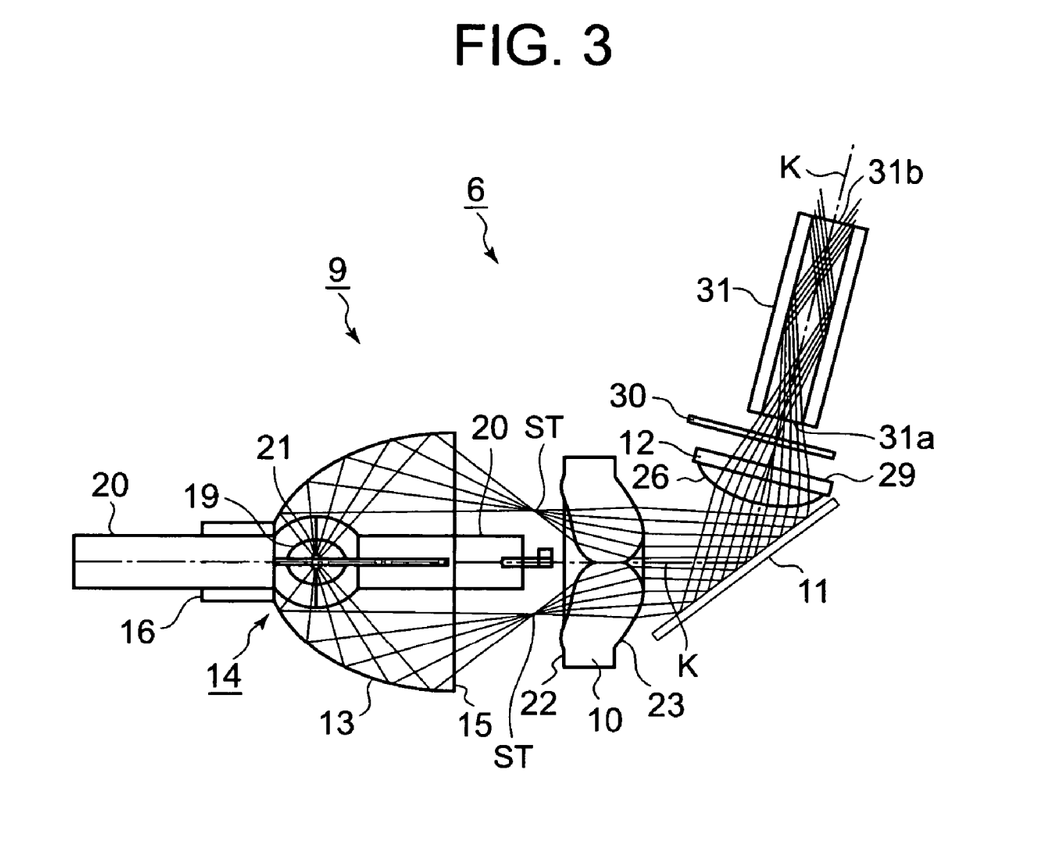
FIG. 3 is a schematic sectional view of a light source unit according to the first embodiment.

FIG. 1 is a plan view showing an interior of a projector system according to an embodiment of the invention. FIG. 2 is a schematic diagram showing the configuration of an optical system of the projector system according to the embodiment. FIG. 3 is a schematic sectional view of a light source unit.

As is shown in FIG. 1, a cooling fan 3 which sucks air from an upper surface thereof is disposed in the vicinity of a central portion of an interior of a case 2 of a projector system 1. In addition, air suction ports 4, 4 are formed in a pair of sides of the case 2 which face each other. The air suction port in each side is formed by a plurality of holes. In addition, an air discharge port 5, which is formed by a plurality of holes, is formed in one of sides of the case 2 where no air suction port 4 is formed. In addition, a power supply substrate 7 for controlling the whole of the projector system 1, on which a power supply, not shown, is mounted, is disposed in the interior of the case 2.

In addition, a light source unit 6, which is controlled by the power supply circuit board 7, is disposed in the interior of the case 2 at a location lying in the vicinity of the side of the case 2 where the air discharge port 5 is provided. The light source unit 6 is made up of a light source 9, an anomalous lens 10 (a rotary aspherical lens), a primary reflecting mirror 11 and a spherical lens 12. As is shown in FIG. 3, the light source 9 is made up of a reflector 13 and a lamp 14 which is accommodated within the reflector 13.

The reflector 13 is formed into the shape of a multinominal surface. The multinominal surface shape of the reflector 13 is a shape which is expressed by an equation in which values shown in Table 1 are substituted for parameters in an equation (1) below.

(Equation 1)

$$z = \frac{cr^2}{1 + \sqrt{1 - (1+k)c^2 r^2}} + c1r + c2r^2 + c3r^3 + c4r^4 \quad (1)$$

TABLE 1

| | |
|---|---|
| Diameter of Light exiting opening (mm) | 33.955 |
| Diameter of Lamp Accommodating Opening (mm) | 11 |
| Conic Constant: k | −3.67011841E−01 |
| Radius of curvature: c | 7.62777804E−02 |
| Coefficient: c1 | 5.03015585E−02 |
| Coefficient: c2 | −7.14558835E−03 |
| Coefficient: c3 | 1.09782503E−03 |
| Coefficient: c4 | −2.91355712E−05 | where, z denotes an axis in the direction of the optical axis (a direction in which light travels is regarded as positive), c denotes a radius of curvature, k denotes a Conic constant, and r(mm) is the length of a perpendicular when the perpendicular is drawn from an edge portion of a light exiting opening 15, which will be described later on, to the optical axis K.

In addition, the light exiting opening 15 from which light exits is provided in the reflector 13 as shown in FIG. 3. Furthermore, a lamp accommodating opening 16 is also provided in a proximal portion of the reflector 13, so that the lamp 4 is designed to be accommodated from the lamp accommodating opening 16.

Figure 4A:
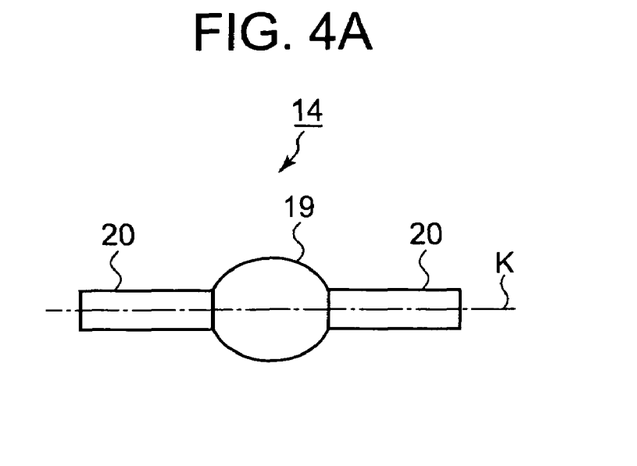
FIGS. 4A, 4B, 4C are schematic diagrams showing a lamp used in the invention.

As is shown in FIG. 4A, the lamp 14 is made up of a bulb 19 which emits light and electrode introducing portions 20, 20 which are provided at both ends of the bulb 19 in a direction of a major axis thereof so that electrodes are introduced into the bulb 19 therefrom. In addition, as is shown in FIG. 3, an arc 21 which produces a discharge of electricity is provided within the bulb 19. The bulb 19 is disposed in the vicinity of the lamp accommodating opening 16 within the reflector 13 in such a manner that the position of a focal point (ST) of radiated light which is radiated from the bulb 19 and is reflected by an inner wall of the reflector 13 is formed further forward in a traveling direction of the radiated light than the electrode introducing portion 20.

As a specific shape of the bulb 19 used in this invention, a shape is raised which will be described below.

Figure 4B:
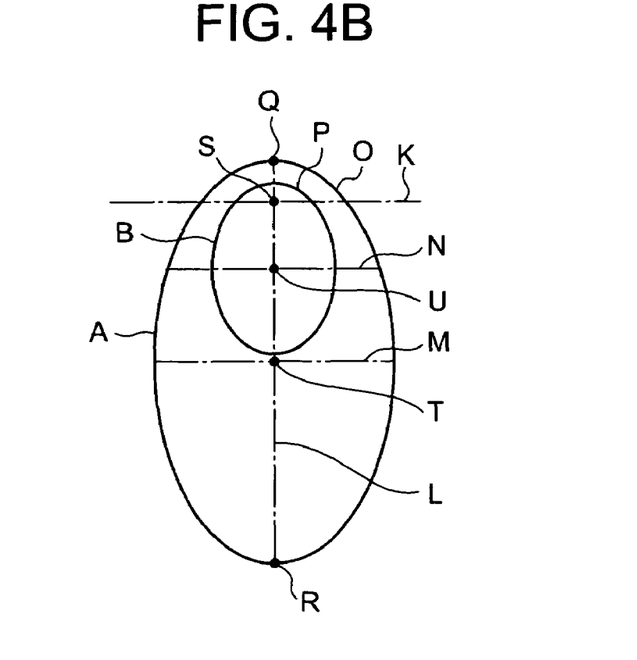

Firstly, as is shown in FIG. 4B, an ellipse A, which has a Conic constant of −0.91598, a radius of curvature of 4.175964, a major radius of 49.17239 mm and a minor radius of 14.32976 mm, is made to be situated in such a manner that a major axis L thereof intersects the optical axis K. As this occurs, the ellipse A is disposed such that the major axis L of the ellipse A intersects the optical axis K in a position which lies 5.25 mm from a point Q at one end toward a point R at the other end of the major axis L of the ellipse A (hereinafter, the point where the major axis L of the ellipse A interests the optical axis K is referred to as a point S).

Next, an ellipse B is disposed such that a central point U thereof is situated in a position which lies 24.77409 mm from a central point T of the ellipse A toward the point Q and a minor axis N of the ellipse B becomes parallel to a minor axis M of the ellipse A. The ellipse B has a Conic constant of −0.85721, a radius of curvature of 3.110047 mm, a major radius of 21.7811 mm and a minor radius of 8.2304455 mm.

Figure 4C:
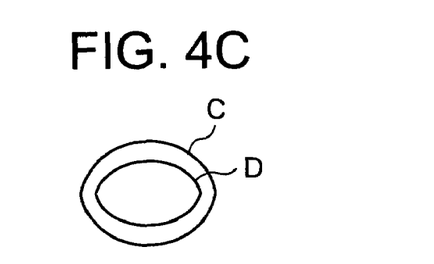

Next, the ellipse A and the ellipse B are rotated about the optical axis K. Then, a solid spindle C shown in FIG. 4C is formed by an arc O of the ellipse A which rotates about the optical axis K and lies closer to the point Q than the optical axis K.

An external edge portion of the solid spindle C corresponds to an outer circumferential portion of the bulb used in the embodiment. In addition, an internal space of a spindle D which is formed by virtue of the rotation of an arc P of the ellipse B which lies closer to the point Q than the optical axis K about the optical axis K corresponds to a space in the bulb where the arc 21 is accommodated.

In addition, the shape of a space defined between the spindle C and the spindle D corresponds to the shape of a glass member which accommodates therein the arc 21, and the point S corresponds to the position of the arc 21. As is shown in FIG. 4A, the electrode introducing portions 20, 20 for supplying power to the arc 21 are attached to the longitudinal ends of the bulb 19 which is formed as described above, whereby the lamp 14 used in the invention is formed.

An anomalous lens 10 is disposed in a traveling direction of light that has exited from the light exiting opening 15 of the reflector 13. There is imposed no limitation on the shape of the anomalous lens 10, provided that the lens can collect sufficiently light that has exited from the light exiting opening 15 so as to cause the light so collected to exit in the light traveling direction. An example of a lens which can used as the anomalous lens 10 will be described below.

Figure 5:
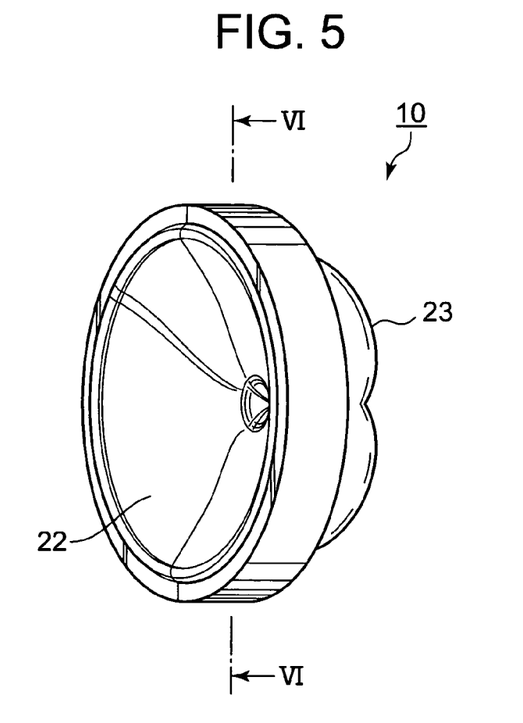
FIG. 5 is a schematic perspective view of an anomalous lens used in the invention.
Figure 6:
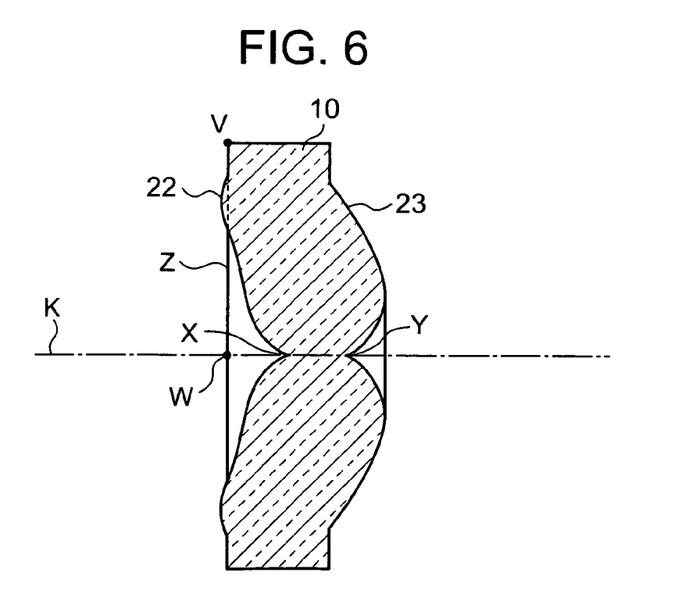
FIG. 6 is a sectional view of the anomalous lens shown in FIG. 5 taken along the line VI-VI.

FIG. 5 is a schematic perspective view of an example of an anomalous lens 10, and FIG. 6 is a sectional view taken along the line VI-VI of the anomalous lens 10 shown in FIG. 5.

As is shown in FIGS. 5 and 6, a lens surface 22 of the anomalous lens 10 which lies on a side thereof where light that has exited from the light exiting opening 15 of the reflector 13 is shone is defined by a flat surface portion formed around a circumferential edge portion of the lens surface 22, a swelling portion which is formed in such a manner as to be closer to a central portion of the one lens surface 22 while continuing to the flat surface portion, and a concave surface portion which is formed in such a manner as not only to be closer to the central portion of the lens surface 22 while continuing to the swelling portion but also to be recessed at the central portion.

In addition, a lens surface of the anomalous lens 10 which lies on a side thereof where the light that has entered the anomalous lens 10 exits therefrom is defined by a flat surface portion formed around a circumferential edge portion of the lens surface 23 and a swelling portion which is formed in such a manner as not only to swell towards a central portion of the lens surface 23 while continuing to the flat surface portion but also to be recessed at the central portion of the lens surface 23.

The anomalous lens 10 is disposed such that the lens surface 22 faces the light exiting opening 15 of the reflector 13 of the light source 9. In addition, the anomalous lens 10 is disposed such that the center of the lens surface 22 and the center of the lens surface 23 are situated on the optical axis K.

The shape of the lens surface 22 of the anomalous lens 10 which lies on the side thereof which faces the light source 9 and the shape of the lens surface 23 of the anomalous lens 10 which lies on the side thereof which faces a primary reflecting mirror 11 are represented by an equation in which values shown in Table 2 are substituted for parameters in an equation (2) below.

(Equation 2)

$$z = \frac{cr^2}{1+\sqrt{1-(1+k)c^2r^2}} + c_1 r + c_2 r^2 + c_3 r^3 + c_4 r^4 + c_5 r^5 + c_6 r^6 \quad (2)$$

TABLE 2

|  | Lens Surface 22 | Lens surface 23 |
|---|---|---|
| Conic Constant: k | −1 | −1 |
| Radius of curvature: c | Infinity | Infinity |
| Coefficient: c1 | −1.903990E+00 | 1.030861E+00 |
| Coefficient: c2 | 5.644817E−01 | −1.438065E−01 |
| Coefficient: c3 | −7.786002E−02 | 1.668033E−03 |
| Coefficient: c4 | 3.171810E−03 | −3.641771E−05 |
| Coefficient: c5 | 1.292878E−04 | 2.168144E−05 |
| Coefficient: c6 | −8.421956E−06 | −5.061780E−07 | where, z denotes an axis in the direction of the optical axis (a direction in which light travels is regarded as positive), c denotes a radius of curvature, and k denotes a Conic constant. In addition, r(mm) is the length of a perpendicular from a point V, which is a point on an edge portion of the anomalous lens 10, to a point W where the perpendicular intersects the optical axis K when the perpendicular is drawn from the point V to the optical axis K as shown in FIG. 6.

Figure 7:
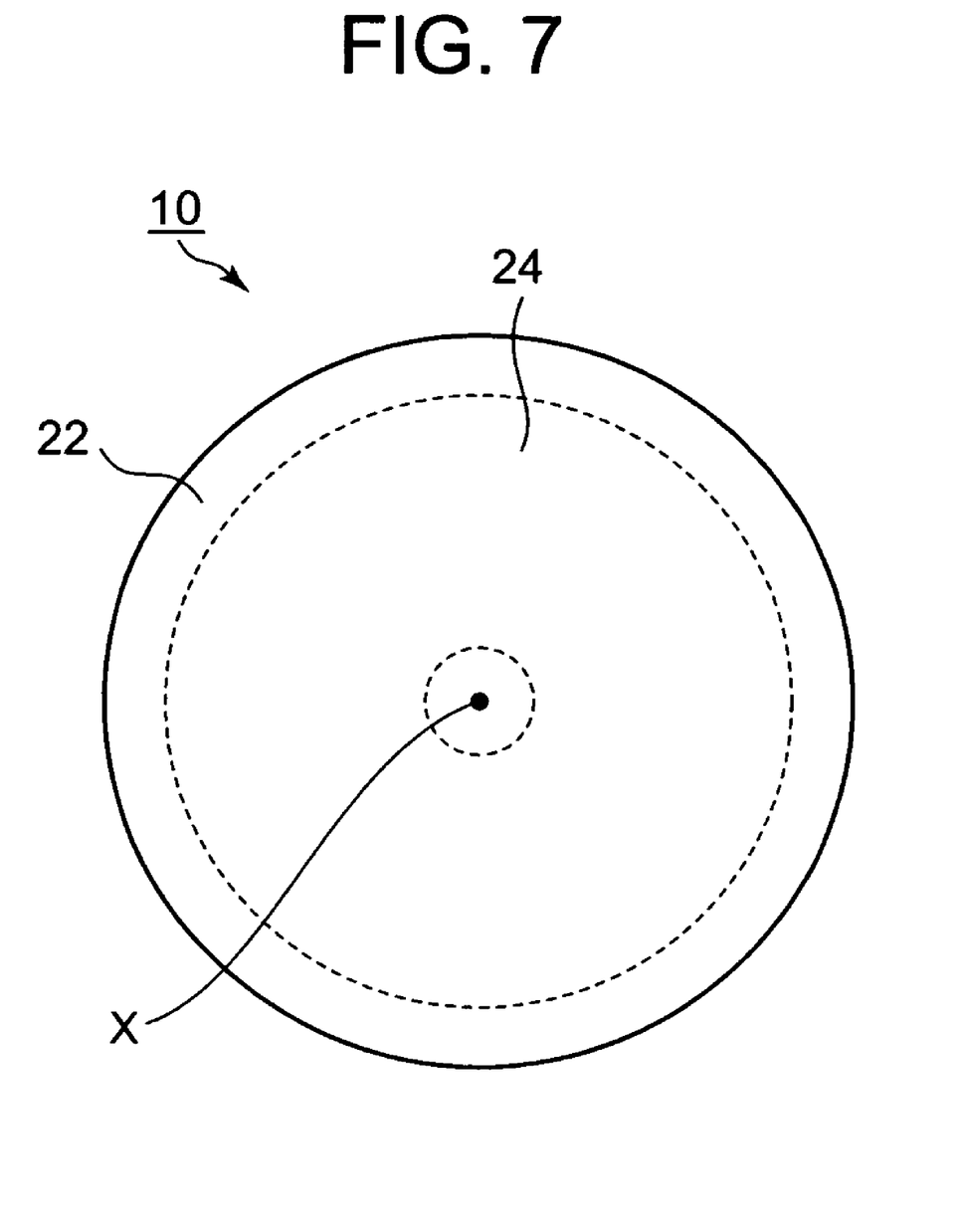
FIG. 7 is a schematic front view of a light source side lens surface of the anomalous lens shown in FIG. 5.

The lens surface 22 of the anomalous lens 10 which lies on the side thereof which faces the light source 9 can be separated into a range which collects light shone on to the lens surface 22 and guides the light so collected to the lens surface 23 which lies on the side of the anomalous lens 10 which faces the primary reflecting mirror 11 (hereinafter, referred to as an effective range 24) and the other range. In the case of an anomalous lens having a radius of 12.5 mm, the effective range 24 ranges from the outside of a range of a radius of 0.5 mm from the optical axis K to the inside of a range of a radius of 11 mm from the optical axis, as is shown in FIG. 7. In addition, a distance from a central point X to a point Y where the optical axis K intersects the lens surface 23 is 4 mm.

As is shown in FIGS. 1 to 3, the primary reflecting mirror 11 is disposed in a direction in which light exiting from the anomalous lens 10 travels for reflecting light that has so exited from the anomalous lens 10. The primary reflecting mirror 11 is designed to reflect light that has exited from the anomalous lens 10 toward a spherical lens 12.

Figure 8A:
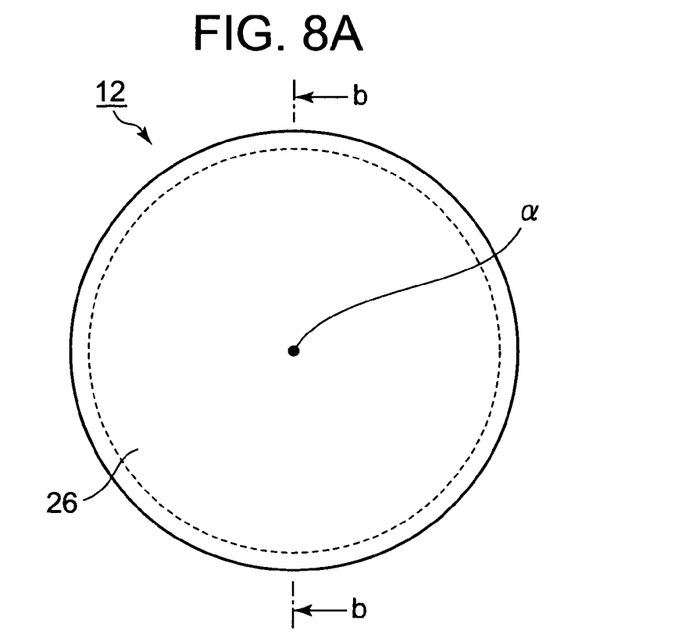
FIG. 8A is a front view of a side of a spherical lens on to which light is emitted.
Figure 8B:
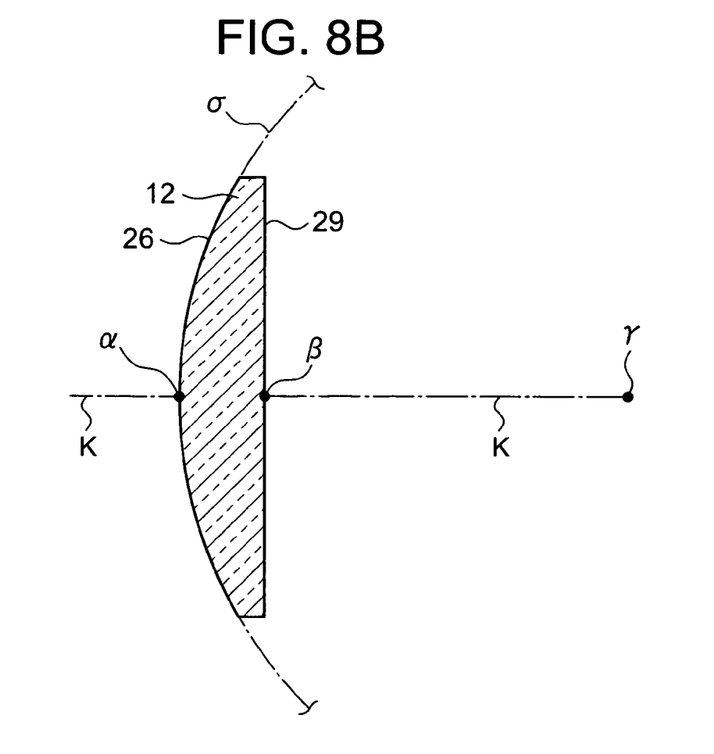
FIG. 8B is a sectional view of the spherical lens taken along the line b-b in FIG. 8A.

FIG. 8A is a front view of a side of the spherical lens on to which light is shone, and FIG. 8B is a sectional view taken along the line b-b in FIG. 8A. The spherical lens 12 has a lens surface 26 which is formed into a spherical shape on a side thereof where light is shone and a lens surface 29 which is formed into a flat shape on a side thereof where light is caused to exit. As is shown in FIG. 8B, the spherical lens 12 is disposed such that a central point α of the lens surface 26 and a central point β of the lens surface 29 are situated on the optical axis K.

The spherical lens 12 has a radius of 7.5 mm, for example, and as is shown in FIG. 8A, in the lens surface 26, a range lying inside a radius of 7 mm from the optical axis K constitutes a range for guiding light shone on to the lens surface 26 to the lens surface 29.

In addition, as is shown in FIG. 8B, in the lens surface 26, the central point α of the lens surface 26 is situated on the circumference of a circle σ having a radius of 14 mm which is centered at an imaginary point γ lying an extension of a line which connects the central point α of the lens surface 26 with the central point β of the lens surface 29 or on the optical axis K which lies on the side of the lens surface 29, and the lens surface 26 is formed into a spherical surface which follows the circumference of the circle σ. In addition, the lens surface 29 is formed into the shape of a flat plate. A dimension from the central point α of the lens surface 26 with the central point β of the lens surface 29 is 4 mm.

As is shown in FIGS. 1 to 3, a color wheel 30 is disposed in a direction in which light exits from the spherical lens 12 for converting light that has exited from the spherical lens 12 into colors such as red (R), green (G) and blue (B). A mirror tunnel 31 is disposed in a traveling direction of light that has been transmitted through the color wheel 30. Note that the color wheel 30 may be disposed on a side of the mirror tunnel 31 where light exits therefrom.

The color wheel 30 is a circular rotary plate and includes red (R), green (G) and blue (B) color filters. The color wheel 30 is disposed such that a rotational axis thereof is offset to a side of the optical axis K.

The mirror tunnel 31 is a transparent prism and is provide in such a manner as to extend along the optical axis K. A light entering surface or incident surface 31a on which light is incident is a rectangular surface, whose inside shorter side is 4.96 mm and inside longer side is 6.18 mm. The mirror tunnel 31 is designed to guide incident light from the incident surface 31a in the direction of the optical axis while totally reflecting the light on an interface between a side surface of the mirror tunnel 31 and a layer of outside air and to cause the light to exit from a light exiting surface 31b as a luminous flux of a uniform intensity distribution. Note that an angular tube may be used as the mirror tunnel 31 which has a reflecting coating provided on the whole of an inner circumferential surface thereof and whose outside shorter side is 4.96 mm and outside longer side is 6.18 mm.

As is shown in FIGS. 1 and 2, an image projecting unit 32 is disposed in a direction in which light is caused to exit from the mirror tunnel 31. As is shown in FIG. 2, the image projecting unit 32 is made up of, for example, a primary condenser lens 33 on to which light that has exited from the mirror tunnel 31 is shone, a secondary reflecting mirror 34 for reflecting light projected from the primary condenser lens 33, a secondary condenser lens 35 for collecting light reflected by the secondary reflecting mirror 34, a tertiary reflecting mirror 36 for reflecting light projected from the secondary condenser lens 35, a meniscus lens 39 on to which light reflected by the tertiary reflecting mirror 36 is projected, a micromirror device 40 on to which light that has exited from the meniscus lens 39 is shone, and a projection lens 41 on to which light reflected by the mircromirror device 40 is projected.

The primary condenser lens 33 is such as to project light that has exited from the mirror tunnel 31 on to the secondary reflecting mirror 34. In FIG. 2, while illustrated as a singlet lens, the primary condenser lens 33 may be made up of a plurality of lenses.

The secondary reflecting mirror 34 is such as to reflect light projected from the primary condenser lens 33 so as to project the light on to the secondary condenser lens 35.

The secondary condenser lens 35 is such as to collect light reflected by the secondary reflecting mirror 34 so as to project the light on to the tertiary reflecting mirror 36. In FIG. 2, while illustrated as a singlet lens, the secondary condenser lens 35 may be made up of a plurality of lenses.

The tertiary reflecting mirror 36 is disposed to reflect light projected from the secondary condenser lens 35 so as to project the light on to the meniscus lens 39.

The meniscus lens 39 is disposed such that light projected from the tertiary reflecting mirror is projected on to a concave surface side thereof. The meniscus lens 39 is disposed in such a position that light reflected by the mircromirror device 40 is collected so as to be projected on to the projection lens 41. The meniscus lens 39 is disposed such that a convex surface thereof is made to face the micromirror device 40 while the concave surface is made to face the projection lens 41.

The mircromirror device 40 is such as to form each of pixels of an image to be displayed by a plurality of micromirrors and changing the brightness of each pixel by changing the inclination of those micromirrors. The micromirror is formed of an extremely thin metallic piece such as an aluminum piece, and the length and width thereof range from 10 μm to 20 μm. These micromirrors are provided on a plurality of mirror driving devices (not shown) such as CMOS which are arranged and formed in rows and columns into a matrix.

In addition, light reflected from the micromirror device 40 is designed to be projected on to the projection lens 41 after having been transmitted through the meniscus lens 39.

The projection lens 41 is such as to enlarge light reflected from the micromirror device 40 so as to project the light on to a screen (not shown). Note that while illustrated as a singlet lens in FIG. 2, the projection lens 41 may be made up of a plurality of lenses.

The function of the embodiment of the invention will be described below.

When the projector system 1 is activated, light is radiated from the bulb 19 of the light source 9, and most of the light so radiated is shone on to the mirror-finished inner wall of the reflector 13.

As this occurs, as is shown in FIG. 3, the bulb 19 of the light source 9 is designed to form a circle in the vicinity of the lamp accommodating opening 16 in which the position of a focal point (ST) of the radiated light which is radiated from the bulb 19 and reflected by the inner wall of the reflector 13 is positioned between the electrode introducing portion 20 and the light collecting surface of the anomalous lens 10 and which is centered at the optical axis K. Due to this, most of the reflected light is shone on to the other portion than the central portion of the lens surface 22 of the anomalous lens 10. Of the light shone on to the lens surface 22 of the anomalous lens 10, light shone on to the effective range 24 thereof is shone from the lens surface 23 on to the primary reflecting mirror 11 after having been collected.

The light shone on to the primary reflecting mirror 11 is reflected thereon to thereby be shone on to the spherical lens 12. The light shone on to the spherical lens 12 is collected to be shone on to the color wheel 30 thereafter. The light shone on to the color wheel 30 is converted into three colors such as red (R), green (G) and blue (B) by the red (R), green (G) and blue (B) filters provided on the color wheel 30, and thereafter, the light so converted is then shone on to the incident surface 31a of the mirror tunnel 31. The light that has entered the inside of the mirror tunnel 31 is guided in the direction of the optical axis while being totally reflected on the interface between the inner side surface of the mirror tunnel 31 and the layer of outside air as shown in FIG. 3, and the light is shone on to the primary condenser lens 33 after having exited from the exiting surface 31b of the mirror tunnel 31 as shown in FIG. 2.

The light shone on to the primary condenser lens 33 is reduced in expansion of the luminance flux thereof by the primary condenser lens 33 and is thereafter shone on to the secondary reflecting mirror 34. The light shone on to the secondary reflecting mirror is shone on to the secondary condenser lens 35 to thereby be collected and thereafter is shone further on to the tertiary reflecting mirror 36.

The light shone on to the tertiary reflecting mirror 36 is shone on to the meniscus lens 39 and thereafter is shone on to the micromirror device 40. Then, the light reflected by the micromirror device 40 is expanded by the projection lens 41 so as to be projected on to the screen (not shown).

Thus, according to the invention, since the position of the focal point (ST) of the radiated light radiated from the bulb 19 and reflected by the reflector 13 is not situated at the electrode introducing portion 20, most of the radiated light impinges on the electrode introducing portion 20 of the lamp in no case. Due to this, light reflected by the reflector 13 is shone on to the anomalous lens 10 without being dampened, thereby making it possible to reduce the loss of radiated light. Consequently, the utilization efficiency of radiated light radiated from the light source 9 can be increased, and this enables the reflector 13 to be made smaller in size, thereby making it possible to make the whole light source unit 6 smaller in size, compared to the conventional light source unit.

In addition, since the light source unit 6 is made smaller in size, the projector system 1 itself which installs thereon the light source unit 6 can be made smaller in size. Additionally, by disposing the spherical lens 12 between the anomalous lens 10 and the mirror tunnel 31 the position of the focal point of light that has exited from the anomalous lens 10 can be adjusted, thereby making it possible to increase the degree of freedom in designing the light source unit 6 and the projector system 1.

Second Embodiment

Next, another embodiment of the invention will be describe by reference to the accompanying drawings. Note that the description of parts of the second embodiment which are common on the first embodiment will be omitted, and hence, parts which are different from the first embodiment will mainly be described.

Figure 9:
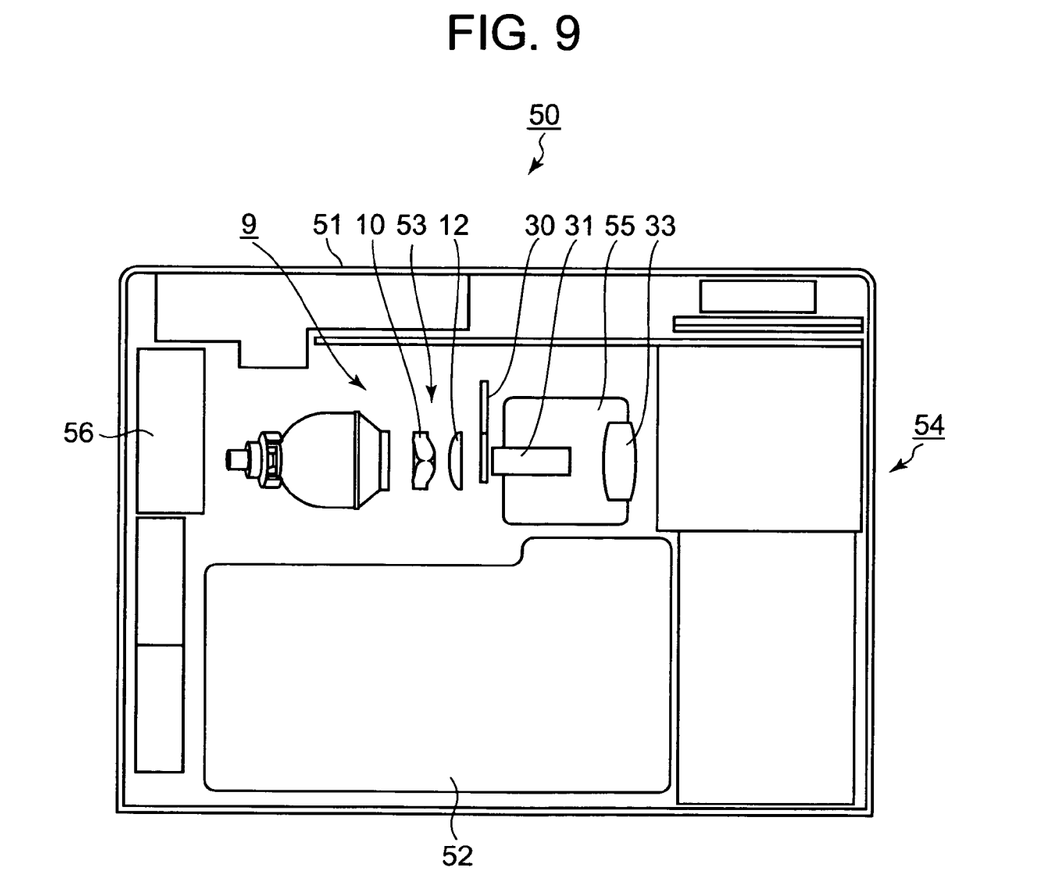
FIG. 9 is a plan view of an interior of a projector system according to a second embodiment of the invention.
Figure 10:
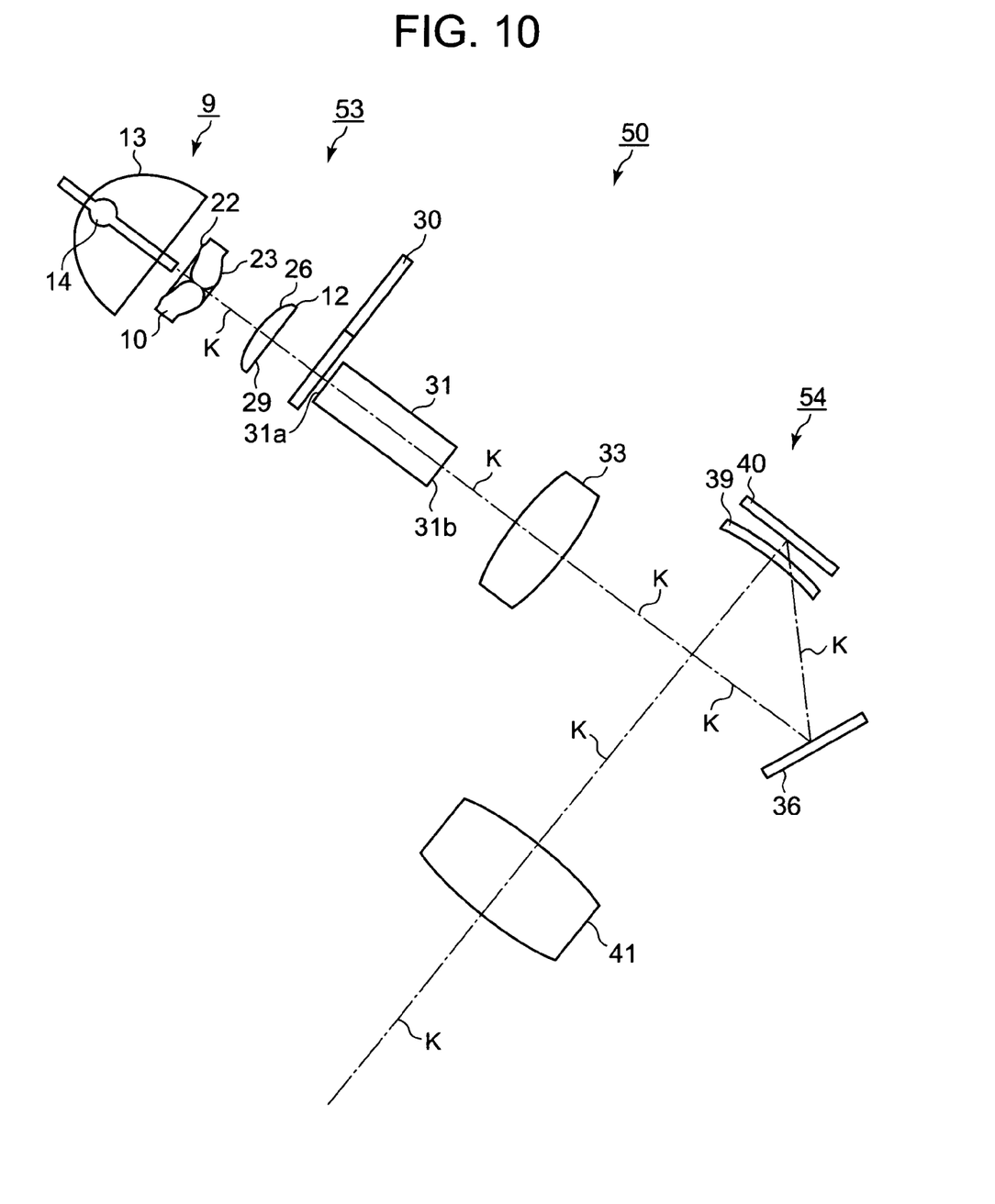
FIG. 10 is a schematic diagram showing the configuration of an optical system of the projector system of the second embodiment.
Figure 11:
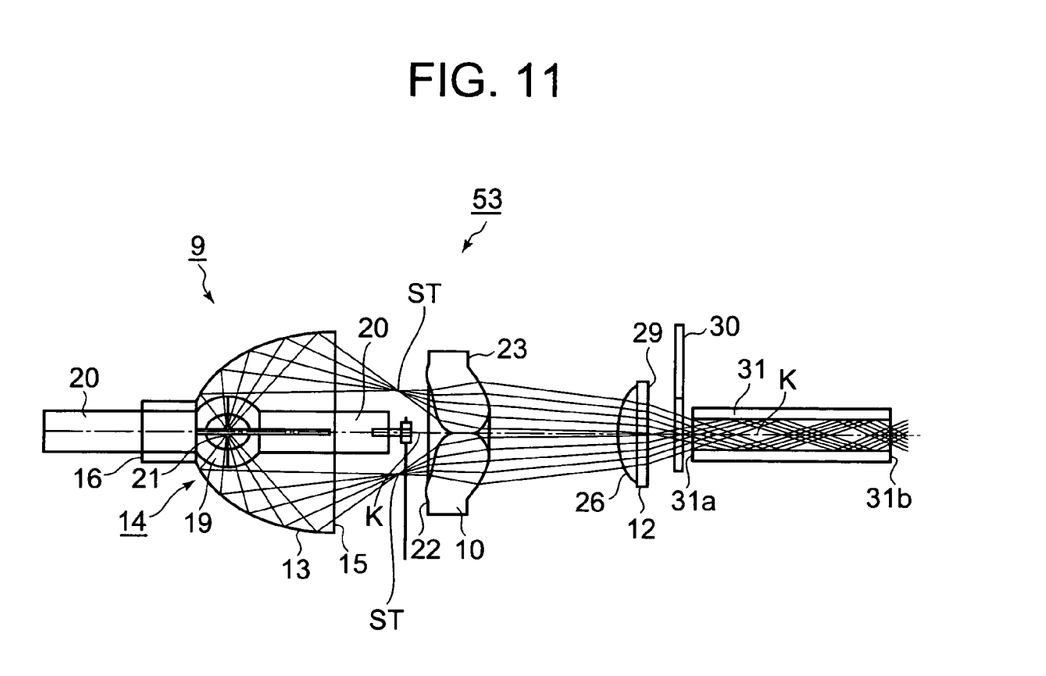
FIG. 11 is a schematic sectional view of a light source unit according to the second embodiment.

FIG. 9 is a plan view showing an interior of a projector system according to the second embodiment of the invention. FIG. 10 is a schematic diagram showing the configuration of an optical system of the projector system according to this embodiment. FIG. 11 is a schematic sectional view of a light source unit.

As is shown in FIG. 9, a power supply substrate 52 for controlling the whole of a projector system 50 on which a power supply, not shown, is mounted is disposed in an interior of a case 51 of the projector system 50. A light source unit 53, which is controlled by the power supply substrate 52, is disposed in the vicinity of a central portion in the case 51.

As is shown in FIGS. 9 and 10, the light source unit 53 is made up of a light source 9, an anomalous lens 10 and a spherical lens 12. As is shown in FIG. 10, the light source 9 is made up of a reflector 13 and a lamp 14 which is accommodated in the reflector 13.

In addition, as is shown in FIG. 11, a light exiting opening 15 from which light is caused to exit is provided in the reflector 13. Furthermore, a lamp accommodating opening 16 is also provided in a proximal portion of the reflector 13, so that the lamp 14 is accommodated from the lamp accommodating opening 16.

The anomalous lens 10 is disposed in a traveling direction of light that has exited from the light exiting opening 15. There is imposed no limitation on the shape of the anomalous lens 10, provided that the anomalous lens 10 can collect sufficiently light that has exited from the light exiting opening 15 so as to cause the light to exit in the light traveling direction.

As is shown in FIGS. 9 and 10, the spherical lens 12 is disposed in a traveling direction of light that has exited from the anomalous lens 10. A color wheel 30 is disposed in a traveling direction of light that has exited from the spherical lens 12 for converting light that has exited from the spherical lens 12 into colors such as red (R), green (G) and blue (B). A mirror tunnel 31 is disposed in a traveling direction of light that has exited from the color wheel 30, and an image projecting unit 54 is disposed in a traveling direction of light that has exited from the mirror tunnel 31 for projecting an image on to a screen. Note that the color wheel 30 may be disposed to a light exiting side of the mirror tunnel 31.

As is shown in FIGS. 9 and 10, the image projecting unit 54 is disposed in a direction in which light is caused to exit from the mirror tunnel 31. As is shown in FIG. 10, the image projecting unit 54 is made up of, for example, a primary condenser lens 33 on to which light that has exited from the mirror tunnel is shone, a tertiary reflecting mirror 36 on to which light that has exited from the primary condenser lens 33 is shone, a meniscus lens 39 on to which light that has been reflected from the tertiary reflecting mirror 36 is projected, a micromirror device 40 on to which light that has exited from the meniscus lens 39 is shone, and a projection lens 41 on to which light that has been reflected by the micromirror device 41 is projected.

As is shown in FIG. 9, a sirocco fan 55 is disposed between the case 51 and the mirror tunnel 31 for supplying cooling air into the light source 9 so as to cool the light source 9. In addition, an axial fan 56 is disposed to a side of the reflector 13 where the lamp accommodating opening 16 is provided for discharging air supplied into the light source 9 from the inside of the case 51.

Figure 12:
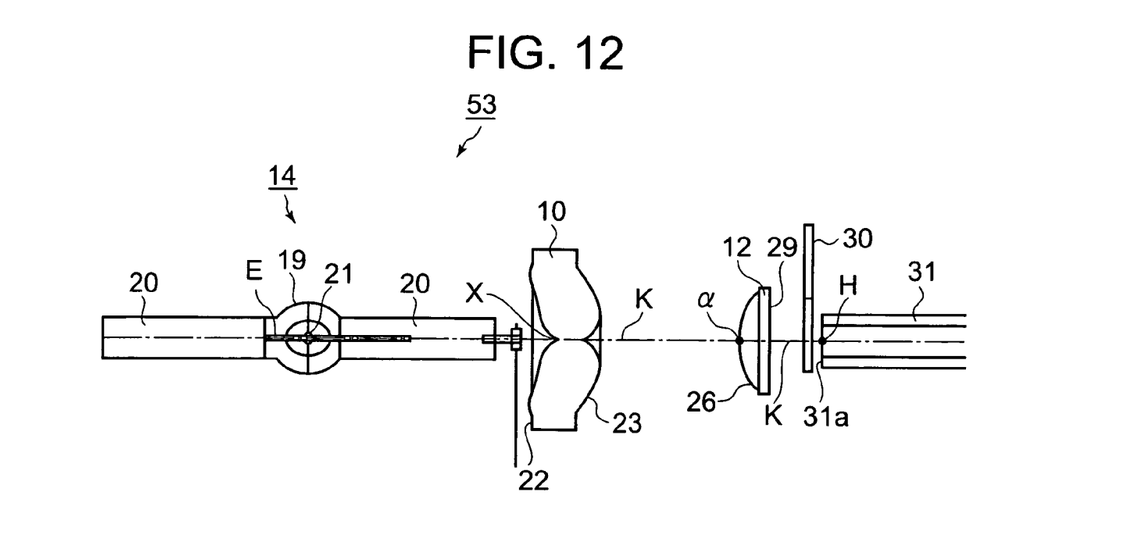
FIG. 12 is a schematic sectional view representing a positional relationship between members making up the light source unit according to the second embodiment.

Here, an example of a positional relationship of the light source unit 53 utilized in this embodiment by reference to FIG. 12. Note that dimensions of the reflector, the lamp and the anomalous lens are those which have been illustrated above therefor.

An arc 21 resides on an optical axis K, and a distance from the arc 21 to an intersection point E between a reflecting surface origin of the reflector 13 which is situated on a proximal portion side of the reflector on the optical axis K and the optical axis K is 5.5 mm. The anomalous lens 10 is disposed such that a central point X of a lens surface 22 of the anomalous lens 10 which lies to face the light source 9 which is situated on the optical axis K is situated a distance of 39.5 mm apart from the intersection point E.

In addition, the spherical lens 12 is disposed such that a central point α of a lens surface 26 of the spherical lens 12 which lies to face the anomalous lens 10 which is situated on the optical axis K is situated a distance of 25.5 mm apart from the central point X of the lens surface 22 of the anomalous lens 10. Additionally, the mirror tunnel 31 is disposed such that a distance from the central point α of the lens surface 26 of the spherical lens 12 which lies to face the anomalous lens 10 to a point H where an incident surface 31a intersects the optical axis K at right angles becomes 10.74 mm.

Next, the function of the embodiment will be described.

When the projector system 50 is activated, light is radiated from a bulb 19 of the light source 9, and most of the light so radiated is shone on to a mirror-finished inner wall of the reflector 13.

As this occurs, as is shown in FIG. 11, since the bulb 19 of the light source 9 is designed to form a circle in the vicinity of the lamp accommodating opening 16 in which the position of a focal point (ST) of the radiated light which is radiated from the bulb 19 and reflected by the inner wall of the reflector 13 is positioned between an electrode introducing portion 20 and the light collecting surface of the anomalous lens 10 and which is centered at the optical axis K, most of the reflected light is shone on to the other portion than the central portion of the lens surface 22 of the anomalous lens 10. Of the light shone onto the lens surface 22 of the anomalous lens 10, light shone on to an effective range 24 thereof is shone from a lens surface 23 on to the spherical lens 12 after having been collected.

The light shone on to the spherical lens 12 is collected to thereby be shone on to he color wheel 30.

The light shone on to the color wheel 30 is converted into three colors such as red (R), green (G) and blue (B) by a red (R), green (G) and blue (B) filters provided on the color wheel 30, and thereafter, the light so converted is then shone on to the incident surface 31a of the mirror tunnel 31. The light that has entered the inside of the mirror tunnel 31 is guided in the direction of the optical axis while being totally reflected on an interface between an inner side surface of the mirror tunnel 31 and a layer of outside air as shown in FIG. 11, and the light is shone on to the primary condenser lens 33 after having exited from an exiting surface 31b of the mirror tunnel 31 as shown in FIG. 10.

The light shone on to the primary condenser lens 33 is reduced in expansion of the luminance flux thereof by the primary condenser lens 33 and is thereafter shone on to the tertiary reflecting mirror 36. The light shone on to the tertiary reflecting mirror 36 is shone on to the meniscus lens 39 and thereafter is shone on to the micromirror device 40. Then, the light reflected by the micromirror device 40 is expanded by the projection lens 41 so as to be projected on to a screen, not shown.

Thus, according to the invention, since the position of the focal point (ST) of the radiated light radiated from the bulb 19 and reflected by the reflector 13 is not situated at the electrode introducing portion 20, most of the radiated light impinges on the electrode introducing portion 20 of the lamp in no case. Due to this, light reflected by the reflector 13 is shone on to the lens without being dampened, thereby making it possible to reduce the loss of radiated light. Consequently, since the utilization efficiency of radiated light radiated from the light source 9 can be increased, the reflector 13 is enabled to be made smaller in size, thereby making it possible to make the whole light source unit 53 smaller in size, compared to the conventional light source unit.

In addition, since the light source unit 53 is made smaller in size, the projector system 50 itself which installs thereon the light source unit 53 can be made smaller in size. Additionally, by disposing the spherical lens 12 between the anomalous lens 10 and the mirror tunnel 31 the position of the focal point of light that has exited from the anomalous lens 10 can be adjusted, thereby making it possible to increase the degree of freedom in designing the light source unit 6 and the projector system 1.

The invention claimed is:

1. A light source unit comprising:
a light source including:
(i) a reflector in which a lamp accommodating opening and a light exiting opening are formed and whose inner surface is mirror finished; and
(ii) a lamp having electrodes in an interior thereof and including a bulb for emitting light and electrode introducing portions which guide the electrodes into the bulb;
an anomalous lens disposed to be situated on an optical axis of light emitted from the light source and adapted to collect the light emitted from the light source; and
a condenser lens for collecting light which has exited from the anomalous lens;
wherein the lamp is inserted into the reflector from the lamp accommodating opening; and
wherein the bulb is disposed within the reflector so that a position of a focal point of radiated light which is reflected from an inner wall of the reflector is not situated on the electrode introducing portions and the anomalous lens, but is situated between the electrode introducing portions and the anomalous lens, forming a circle centered at an optical axis of the radiated light.

2. A light source unit as set forth in claim 1, wherein the anomalous lens has:
a first lens surface formed by a swelling portion which is formed closer to a central portion of the first lens surface than a circumferential edge portion thereof, and a concave surface portion which lies closer to the central portion of the first lens surface while continuing to the swelling portion and which is recessed at the central portion; and
a second lens surface formed by a swelling portion which is made to swell towards a central portion of the second lens surface and which is recessed at the central portion.

3. A projector system comprising:
(a) a light source unit comprising:
a light source including:
(i) a reflector in which a lamp accommodating opening and a light exiting opening are formed and whose inner surface is mirror finished, and
(ii) a lamp having electrodes in an interior thereof and including a bulb for emitting light and electrode introducing portions which guide the electrodes into the bulb,
an anomalous lens disposed to be situated on an optical axis of light emitted from the light source and adapted to collect the light emitted from the light source, and
a condenser lens for collecting light which has exited from the anomalous lens,
wherein the lamp is inserted into the reflector from the lamp accommodating opening, and
wherein the bulb is disposed within the reflector so that a position of a focal point of radiated light which is reflected from an inner wall of the reflector is not situated on the electrode introducing portions and the anomalous lens but is situated between the electrode introducing portions and the anomalous lens, forming a circle centered at an optical axis of the radiated light;
(b) a color wheel for converting light which has exited from the lens into a predetermined color;
(c) a mirror tunnel for guiding light which has exited from the lens;
(d) a condenser lens for collecting light which has exited from the mirror tunnel;

(e) a micromirror device for receiving light which has exited from the condenser lens to project an image; and (f) a projection lens for enlarging the image projected from the micromirror device.

4. A projector system as set forth in claim 3, wherein the anomalous lens has:

a first lens surface formed by a swelling portion which is formed closer to a central portion of the first lens surface than a circumferential edge portion thereof, and a concave surface portion which lies closer to the central portion of the first lens surface while continuing to the swelling portion and which is recessed at the central portion; and a second lens surface formed by a swelling portion which made to swell towards a central portion of the second lens surface and which is recessed at the central portion.

* * * * *